(12) United States Patent
Honda et al.

(10) Patent No.: US 10,057,436 B2
(45) Date of Patent: Aug. 21, 2018

(54) DEVICE MANAGEMENT SYSTEM, IMAGE FORMING APPARATUS, AND NON-TRANSITORY COMPUTER READABLE MEDIUM

(71) Applicant: FUJI XEROX CO., LTD., Tokyo (JP)

(72) Inventors: Hiroshi Honda, Kanagawa (JP); Chigusa Nakata, Kanagawa (JP); Eiji Nishi, Kanagawa (JP); Yoshihiro Sekine, Kanagawa (JP); Kenji Kuroishi, Kanagawa (JP); Hiroshi Mikuriya, Kanagawa (JP); Takeshi Furuya, Kanagawa (JP); Ryuichi Ishizuka, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/461,958

(22) Filed: Mar. 17, 2017

(65) Prior Publication Data
US 2018/0020105 A1 Jan. 18, 2018

(30) Foreign Application Priority Data

Jul. 14, 2016 (JP) .................................. 2016-139677

(51) Int. Cl.
| | |
|---|---|
| *G06F 15/00* | (2006.01) |
| *H04N 1/00* | (2006.01) |
| *H04N 1/32* | (2006.01) |
| *H04N 1/028* | (2006.01) |

(52) U.S. Cl.
CPC ..... *H04N 1/00344* (2013.01); *H04N 1/00251* (2013.01); *H04N 1/02815* (2013.01); *H04N 1/32502* (2013.01)

(58) Field of Classification Search
CPC .......... H04N 1/00344; H04N 1/32502; H04N 1/00251; H04N 1/02815
USPC ...................................................... 358/1.15
See application file for complete search history.

(56) References Cited

U.S. PATENT DOCUMENTS

| | | | | |
|---|---|---|---|---|
| 2001/0052858 | A1* | 12/2001 | Vincent ................ | G05B 19/042 340/12.25 |
| 2008/0196095 | A1 | 8/2008 | Sheynblat et al. | |
| 2009/0009592 | A1* | 1/2009 | Takata ............... | G02B 27/2214 348/47 |
| 2015/0109438 | A1* | 4/2015 | Matsuda .................. | H04N 5/76 348/143 |

FOREIGN PATENT DOCUMENTS

| | | |
|---|---|---|
| JP | 2008-176713 A | 7/2008 |
| JP | 2010-510588 A | 4/2010 |

* cited by examiner

*Primary Examiner* — Saeid Ebrahimi Dehkordy
(74) *Attorney, Agent, or Firm* — Sughrue Mion, PLLC (57) ABSTRACT

Provided is a device management system including
plural situation grasping devices that are provided in an office room, each of which grasps surrounding situations, and
an image forming apparatus that is provided in the office room, includes a storage unit storing information on the plural situation grasping devices, and forms an image on a recording material.

20 Claims, 9 Drawing Sheets

MANAGEMENT TABLE

| No. (MANAGEMENT NO) | NAME | PHYSICAL POSITION (XY COORDINATE OF FLOOR LAYOUT) | POSITION ON NETWORK (IP ADDRESS) | ABILITY (TYPE OF SENSOR) | LIFE-AND-DEAD STATE | PARENT SENSOR |
|---|---|---|---|---|---|---|
| 1 | TempSensor1 | (1240,40) | 192.168.0.10 | temperature | Alive | - |
| 2 | HumidSensor1 | (560,128) | 192.168.0.11 | humidity | Alive | - |
| 3 | AccelSensor1 | (70,2000) | 192.168.0.12 | acceleration | Death | - |
| 4 | TempSensor2 | (1220,40) | 192.168.0.13 | temperature | Death | TempSensor1 |
| 5 | TempSensor3 | (1230,40) | 192.168.1.20 | temperature | Alive | TempSensor1 |
| 6 | TempSensor4 | (1230,10) | 192.168.1.21 | temperature | Alive | TempSensor3 |
| 7 | TempSensor5 | (1230,20) | 192.168.1.22 | temperature | Alive | TempSensor3 |

DEVICE MANAGEMENT SYSTEM, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-139677 filed Jul. 14, 2016.

BACKGROUND

Technical Field

The present invention relates to a device management system, an image forming apparatus, and a non-transitory computer readable medium.

SUMMARY

According to an aspect of the invention, there is provided a device management system including plural situation grasping devices that are provided in an office room, each of which grasps surrounding situations, and an image forming apparatus that is provided in the office room, includes a storage unit storing information on the plural situation grasping devices, and forms an image on a recording material.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described in detail with reference to the accompanying drawings.

Figure 1:
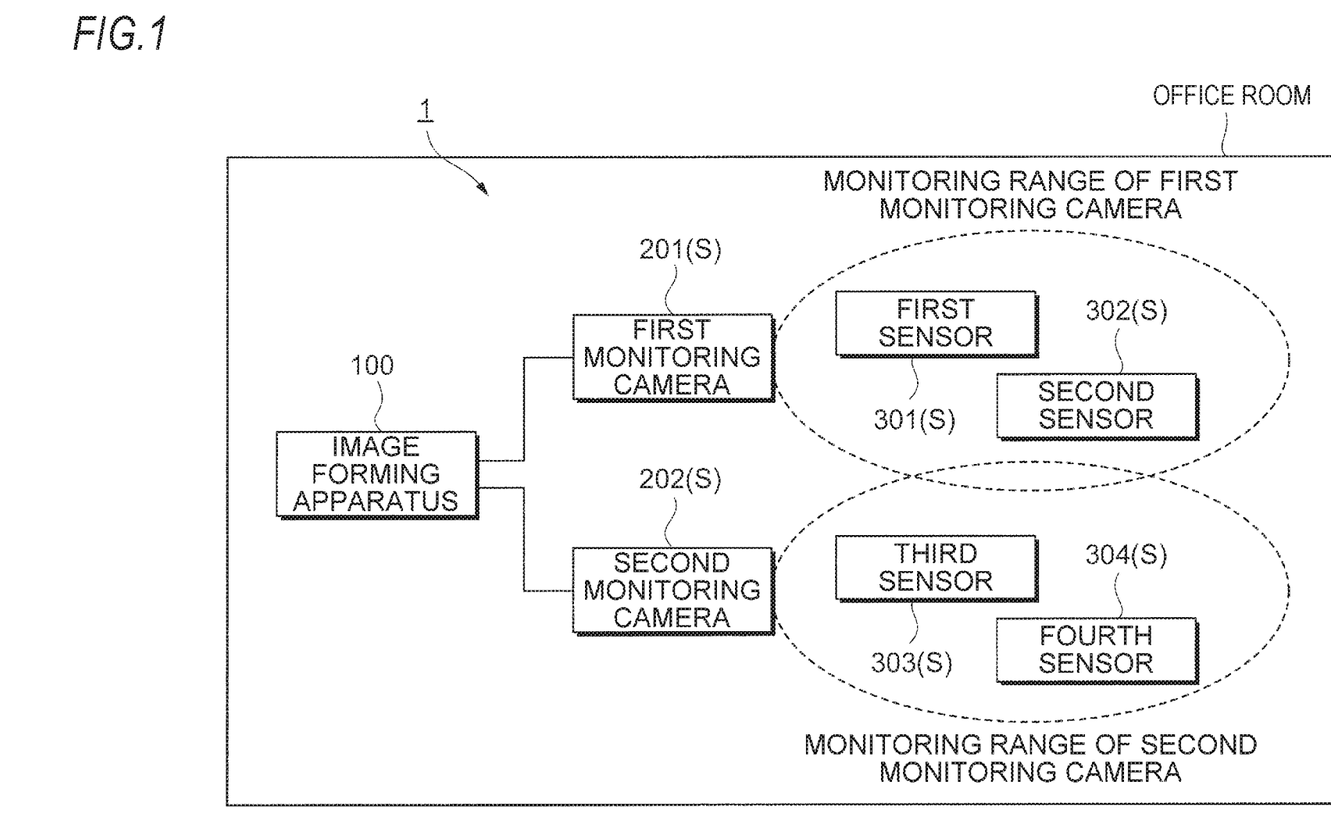
FIG. 1 is a view illustrating the overall configuration of a device management system according to an exemplary embodiment.

FIG. 1 is a view illustrating the overall configuration of a device management system 1 according to an exemplary embodiment.

The device management system 1 according to the present exemplary embodiment includes an image forming apparatus 100 that forms an image on a sheet which is one example of a recording material.

In addition to the function of forming an image on a sheet, the image forming apparatus 100 further has a scanning function of reading an image on an original, and a FAX function of performing FAX transmission.

The device management system 1 further includes a first monitoring camera 201 and a second monitoring camera 202 functioning as situation grasping devices, and first to fourth sensors 301 to 304 also functioning as the situation grasping devices.

The first monitoring camera 201, the second monitoring camera 202, and the first to fourth sensors 301 to 304 grasp their respective surrounding situations.

Here, the image forming apparatus 100, the first monitoring camera 201, the second monitoring camera 202, and the first to fourth sensors 301 to 304 are provided in the same office room.

In addition, the image forming apparatus 100, the first monitoring camera 201, the second monitoring camera 202, and the first to fourth sensors 301 to 304 are connected to the same network. In other words, the first monitoring camera 201, the second monitoring camera 202, and the first to fourth sensors 301 to 304 are connected to the image forming apparatus 100.

In this exemplary embodiment, the image forming apparatus 100 receives information on situations grasped by each of the first monitoring camera 201, the second monitoring camera 202 and the first to fourth sensors 301 to 304.

The first monitoring camera 201, the second monitoring camera 202, the first to fourth sensors 301 to 304 may be connected to the image forming apparatus 100 via a wired line or over a wireless line using Wi-Fi (registered trademark), Bluetooth (registered trademark) or the like.

In the present specification, hereinafter, the first monitoring camera 201, the second monitoring camera 202 and the first to fourth sensors 301 to 304 will be simply referred to as sensors S unless not distinguished from one another.

Figure 2:
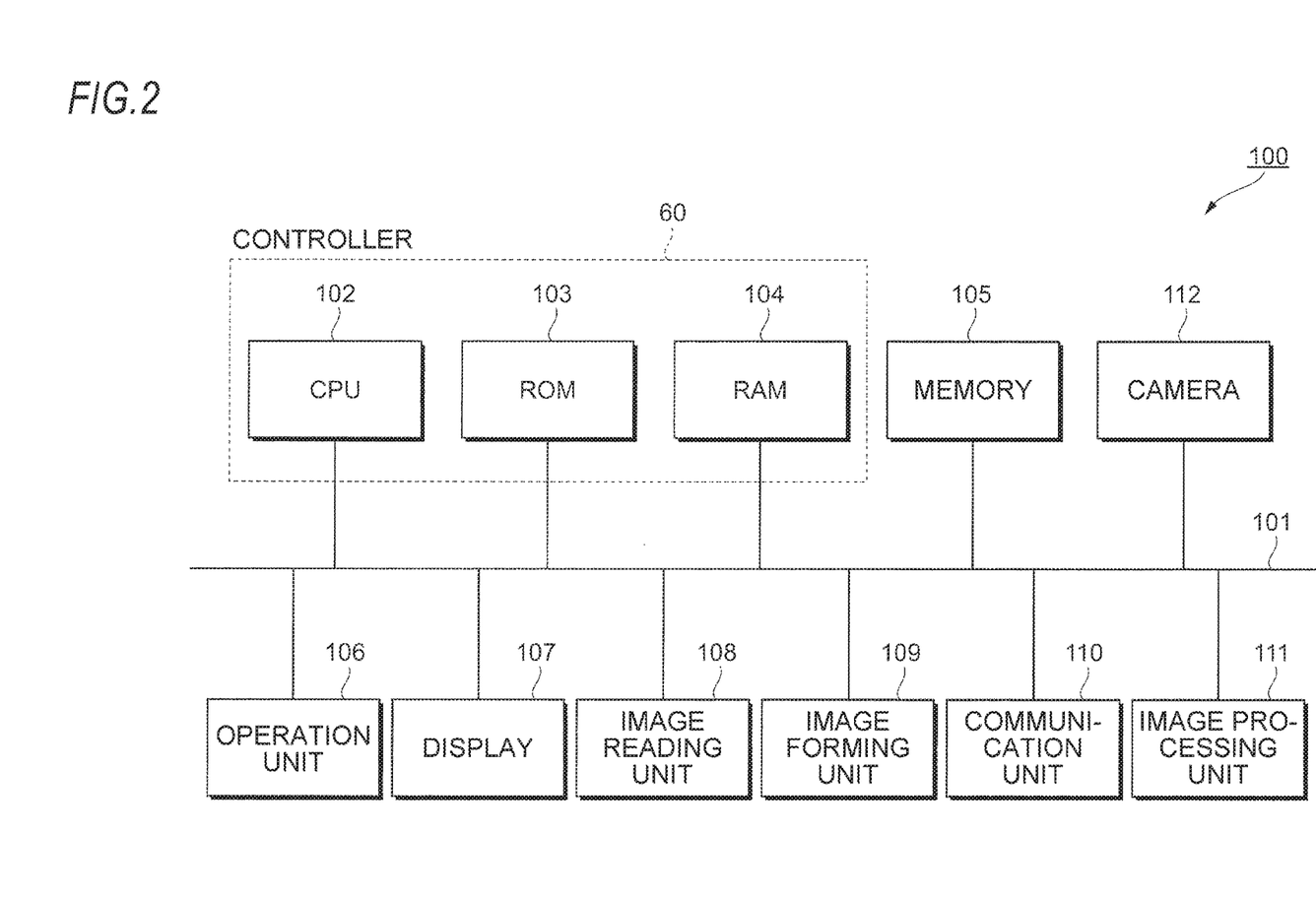
FIG. 2 is a view illustrating the configuration of an image forming apparatus.

FIG. 2 is a view illustrating the configuration of the image forming apparatus 100.

Functional units configuring the image forming apparatus 100 according to the present exemplary embodiment are connected to a bus 101 and exchange data via the bus 101.

As illustrated in FIG. 2, the image forming apparatus 100 according to the present exemplary embodiment includes an operation unit 106. The operation unit 106 receives a user's operation. The operation unit 106 includes, e.g., a hardware key. Alternatively, the operation unit 106 may include, e.g., a touch panel that outputs a control signal corresponding to a pressed position.

A display 107 as an example of a display unit includes, e.g., a liquid crystal display and displays information on the image forming apparatus 100 under the control of a CPU 102. In addition, the display 107 displays a menu screen which is referred to by a user who operates the image forming apparatus 100. Further, the display 107 displays information on the sensors S.

An image reading unit 108 includes a so-called scanner device, reads an image on a set original and generates a read image (image data).

An image forming unit 109, as an example of an image forming unit, uses, e.g., an electrophotographic system to form a toner image according to image data on a sheet as one example of a recording material.

Alternatively, the image forming unit 109 may use another method such as an inkjet head system to form an image.

The image forming apparatus 100 further includes a communication unit 110 that functions as a receiving unit, a transmitting/receiving unit and a transmitting unit. The communication unit 110 functions as a communication interface for communicating with the sensors S or other apparatuses such as other image forming apparatuses 100.

More specifically, the communication unit 110 receives information on situations grasped by each of the sensors S (hereinafter referred to as "situation information") from each sensor S. In addition, the communication unit 110 transmits information on each sensor S to other image forming apparatuses 100. In addition, the communication unit 110 receives information on sensors S from other image forming apparatuses 100.

The image forming apparatus 100 further includes an image processing unit 111 and a memory 105.

The image processing unit 111 performs an image processing such as a color correction or a tone correction on an image represented by the image data.

The memory 105 as an example of a storage unit includes a storage device such as a hard disk device and stores a read image generated by, e.g., the image reading unit 108.

Further, the memory 105 stores information on plural provided sensors S. Specifically, in the present exemplary embodiment, information on the sensors S is acquired by a sensor information acquiring unit 61, which will be described later, and the memory 105 stores the information on the sensors S acquired by the sensor information acquiring unit 61.

More specifically, a management table (which will be described later) used for management of the sensors S is stored in the memory 105 which then uses the management table to manage the information on the sensors S.

The image forming apparatus 100 further includes a camera 112 as one example of a capturing unit.

The camera 112 includes, e.g., a charge coupled device (CCD). In the present exemplary embodiment, the situations in the office room are captured by the camera 112. More specifically, the sensors S provided in the office room are captured.

The image forming apparatus 100 further includes a controller 60.

The controller 60 includes a central processing unit (CPU) 102, a read only memory (ROM) 103 and a random access memory (RAM) 104.

The ROM 103 stores a program to be executed by the CPU 102. The CPU 102 reads the program stored in the ROM 103 and executes the program with the RAM 104 as a work area.

When the program is executed by the CPU 102, each unit of the image forming apparatus 100 is controlled by the CPU 102 to allow the image forming apparatus 100, for example, to form an image on a sheet or read an original to generate a read image of the original.

Figure 3:
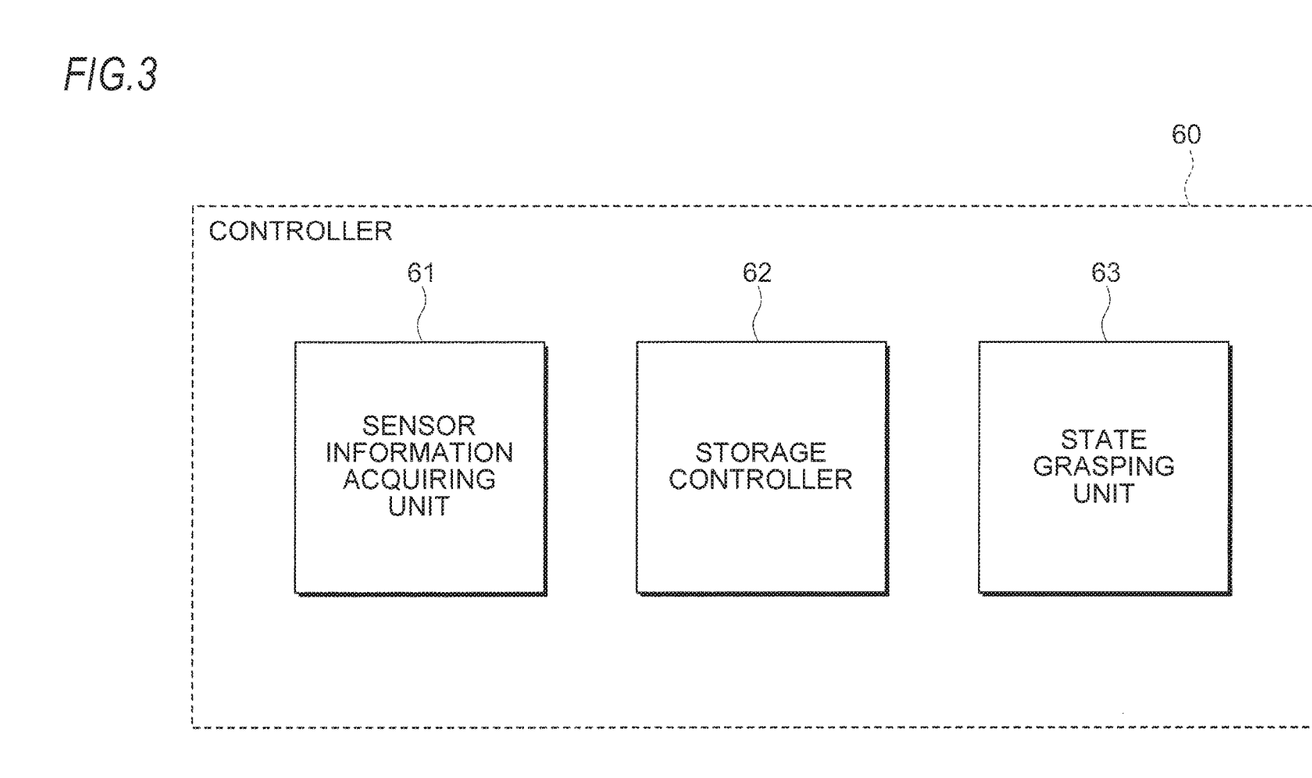
FIG. 3 is a block diagram illustrating the functional configuration of a controller.

In the present exemplary embodiment, as the program is executed by the CPU 102, as illustrated in FIG. 3 (a block diagram illustrating the functional configuration of the controller 60), the controller 60 functions as the sensor information acquiring unit 61, a storage controller 62 and a state grasping unit 63.

The sensor information acquiring unit 61 as one example of an acquiring unit acquires information on each of the plural provided sensors S. More specifically, the sensor information acquiring unit 61 acquires information on each of the sensors S via the communication unit 110 (see FIG. 2). Further, the sensor information acquiring unit 61 analyzes a result of capturing obtained by the camera 112 (see FIG. 2) to acquire the information on each sensor S.

The storage controller 62 causes the memory 105 to store the information on the sensors S acquired by the sensor information acquiring unit 61.

The state grasping unit 63 as an example of a state grasping unit grasps the state of each of the plural provided sensors S.

The sensor information acquiring unit 61, the storage controller 62 and the state grasping unit 63 are implemented by cooperation of software and hardware resources.

Specifically, in the present exemplary embodiment, an operating system and programs executed in cooperation with the operating system are stored in the ROM 103 (see FIG. 2) or the memory 105. In the present exemplary embodiment, the CPU 102 reads these programs from the ROM 103 or the like into the RAM 104, which is a main storage device, and executes these programs to implement the respective functional units of the sensor information acquiring unit 61, the storage controller 62 and the state grasping unit 63.

Here, the programs executed by the CPU 102 may be provided to the image forming apparatus 100 in a form stored in a computer-readable recording medium such as a magnetic recording medium (such as a magnetic tape, a magnetic disk), an optical recording medium (such as an optical disc), a magneto-optical recording medium, a semiconductor memory or the like. Further, the programs executed by the CPU 102 may be downloaded to the image forming apparatus 100 by a communication unit such as the Internet.

In the present exemplary embodiment, when a new sensor S is connected to the device management system 1 illustrated in FIG. 1, the image forming apparatus 100 detects the connection of a new sensor S to a communication line configuring the device management system 1 by UPnP (Universal Plug and Play) or the like.

In this case, the storage controller 62 of the image forming apparatus 100 registers the name of the new sensor S, its position on a network, and the like in a management table (the management table stored in the memory 105).

Furthermore, in the present exemplary embodiment, when the new sensor S is provided within a monitoring range of the first monitoring camera 201 or the second monitoring camera 202 which has been already provided, the name of the sensor S and its physical position are acquired by the first monitoring camera 201 or the second monitoring camera 202.

Then, the name and the position of the sensor S are output to the image forming apparatus 100, and the storage controller 62 of the image forming apparatus 100 registers the name and the position in the management table stored in the memory 105.

In other words, in the present exemplary embodiment, while the plural sensors S such as the first monitoring camera 201, the second monitoring camera 202 and the first to fourth sensors 301 to 304 are provided, some of the plural provided sensors S acquire information on other sensors S newly provided.

In the present exemplary embodiment, the information on the other sensors S acquired by the some sensors S is transmitted to the image forming apparatus 100 and registered in the management table of the image forming apparatus 100.

More specifically, in the present exemplary embodiment, when the new sensor S is provided within the monitoring range of the first monitoring camera 201 or the second monitoring camera 202 that has been already provided, a result of capturing obtained by the first monitoring camera 201 or the second monitoring camera 202 is analyzed by the sensor information acquiring unit 61 (see FIG. 3) of the image forming apparatus 100 to acquire the name and type of the newly provided sensor S.

Specifically, for example, a result of capturing on a two-dimensional barcode attached to the newly provided sensor S is analyzed to acquire the name and type of the sensor S. The name and type are registered in the management table of the image forming apparatus 100.

Furthermore, in the present exemplary embodiment, the sensor information acquiring unit 61 of the image forming apparatus 100 analyzes the capturing result obtained by the first monitoring camera 201 or the second monitoring camera 202 to grasp the relative position of the new sensor S to the first monitoring camera 201 or the second monitoring camera 202.

Then, the sensor information acquiring unit 61 grasps the physical (absolute) position of the new sensor S based on the grasped relative position.

Specifically, in the present exemplary embodiment, the physical position of the first monitoring camera 201 or the second monitoring camera 202 has been already registered in the management table and the sensor information acquiring unit 61 of the image forming apparatus 100 grasps the physical position of the new sensor S (position of the new sensor S in the office room) based on the physical position of the first monitoring camera 201 or the second monitoring camera 202 already registered in the management table and the relative position. Then, the storage controller 62 of the image forming apparatus 100 registers the physical position in the management table.

In the above description, the name and type of the newly provided sensor S are grasped based on the analysis result of the two-dimensional barcode. Alternatively, for example, the shape of the sensor S may be analyzed to grasp the name and type of the sensor S.

More specifically, for example, the shapes and names of various sensors S may be previously registered in the image forming apparatus 100 or an external server (not illustrated) connected with the image forming apparatus 100, and a pattern matching process may be performed between the shape of the sensor S (newly provided sensor S) captured by the first monitoring camera 201 or the second monitoring camera 202 and the registered shapes of the sensors S to grasp the name and type of the newly provided sensor S.

The physical position of the newly provided sensor S may be grasped based on the intensity and direction of a radio wave transmitted from the newly provided sensor S, which are grasped by the image forming apparatus 100, the first monitoring camera 201 or the second monitoring camera 202.

In the device management system 1 according to the present exemplary embodiment, it may be also possible to detect an illegally provided sensor S based on the capturing result obtained by the first monitoring camera 201 or the second monitoring camera 202.

More specifically, if a sensor S is illegally provided in the office room by a third party and the sensor S is within the monitoring range of the first monitoring camera 201 or the second monitoring camera 202, the sensor S is included in the photographing result by the first monitoring camera 201 or the second monitoring camera 202.

In this case, when the image forming apparatus 100 carries out a collation process, it is possible to detect the illegally provided sensor S.

Specifically, the image forming apparatus 100 performs the collation process between the name, shape, physical position, etc. of the sensor S (the illegally provided sensors S) included in the capturing result by the first monitoring camera 201 or the second monitoring camera 202 and the names, shapes, physical positions, etc. of the sensors S already registered in the management table of the image forming apparatus 100.

When the sensor S provided within the monitoring range of the first monitoring camera 201 or the second monitoring camera 202 is not registered in the management table, it is determined that the sensor S is illegally provided.

In this case, the image forming apparatus 100 performs a warning process. Specifically, for example, it is possible to display on the display 107 (see FIG. 2) of the image forming apparatus 100 the effect that there is a sensor S provided illegally or to print out a sheet written with the effect that there is an illegally provided sensor S.

Meanwhile, if the sensor S provided within the monitoring range of the first monitoring camera 201 or the second monitoring camera 202 is registered in the management table, the sensor S has been already registered. In this case, the above-mentioned warning process is not performed.

Further, in the present exemplary embodiment, the state grasping unit 63 of the image forming apparatus 100 grasps the life-and-death state of a sensor S at each predetermined timing. In other words, it is determined whether the sensor S is working normally.

More specifically, the state grasping unit 63 performs, e.g., ping or the like periodically on a sensor S registered in the management table or determines whether or not a push notification has come from the sensor S at each predetermined timing, to thereby determine whether or not the sensor S is working normally. Then, the state grasping unit 63 registers the state of each sensor S in the management table.

The state of the sensor S may be grasped by capturing each sensor S with the first monitoring camera 201, the second monitoring camera 202, the camera 112 included in the image forming apparatus 100, or the like. More specifically, the state of each sensor S may be grasped by analyzing a capturing result obtained by the first monitoring camera 201, the second monitoring camera 202, the camera 112 of the image forming apparatus 100, or the like.

More specifically, the light emission state of a light source provided in each sensor S may be grasped by the first monitoring camera 201, the second monitoring camera 202, the camera 112 of the image forming apparatus 100, or the like, and the state of the sensor S may be grasped based on this light emission state.

For example, a light source such as an LED is provided in each sensor S and is lit up/down at each predetermined timing. Then, the state grasping unit 63 (see FIG. 3) of the image forming apparatus 100 analyzes the capturing result obtained by the first monitoring camera 201, the second monitoring camera 202, the camera 112 of the image forming apparatus 100, etc., to determine whether the light source of the sensor S is lit up or lit down under a predetermined condition.

Then, when the light source is lit up or lit down under a predetermined condition, the state grasping unit 63 determines that the sensor S is working normally. Meanwhile, when the light source is not lit up or not lit down under the predetermined condition, the state grasping unit 63 determines that the sensor S is not working normally.

The light source may be provided for all the sensors S, or may be provided only in some of the sensors S, such as only in sensors S seen from the image forming apparatus 100.

Furthermore, in the present exemplary embodiment, when the user operates the operation unit 106 (see FIG. 2) of the image forming apparatus 100, the positional relationship of the sensors S provided in the office room is displayed on the display 107 of the image forming apparatus 100. More specifically, in the present exemplary embodiment, the physical positions of the sensors S are displayed on the display 107 of the image forming apparatus 100. Thus, by referring to the display 107, for example, the user may grasp where the sensor S is present in the office room.

An object to be displayed on the display 107 is not limited to the physical positions of the sensors S but may be positions of the sensors S on a network. Further, a list of information registered in the management table may be displayed on the display 107.

Further, in the present exemplary embodiment, when the user selects a sensor S from the plural sensors S displayed on the display 107 of the image forming apparatus 100, the image forming apparatus 100 instructs the selected sensor S to light up or down the light source.

As a result, the light source of the sensor S is lit up or down so that the user may more easily find the sensor S in the office room by referring to this lighting-up/down.

Specifically, some or all of the sensors S according to the present exemplary embodiment have their respective receiving units that receive an instruction from the image forming apparatus 100. Upon receiving a light source lighting-up/down instruction in the receiving units, the sensors S light up or down their respective light sources. In this case, the user may more easily find the sensor S in the office room by referring to this lighting-up/down.

Figure 4:
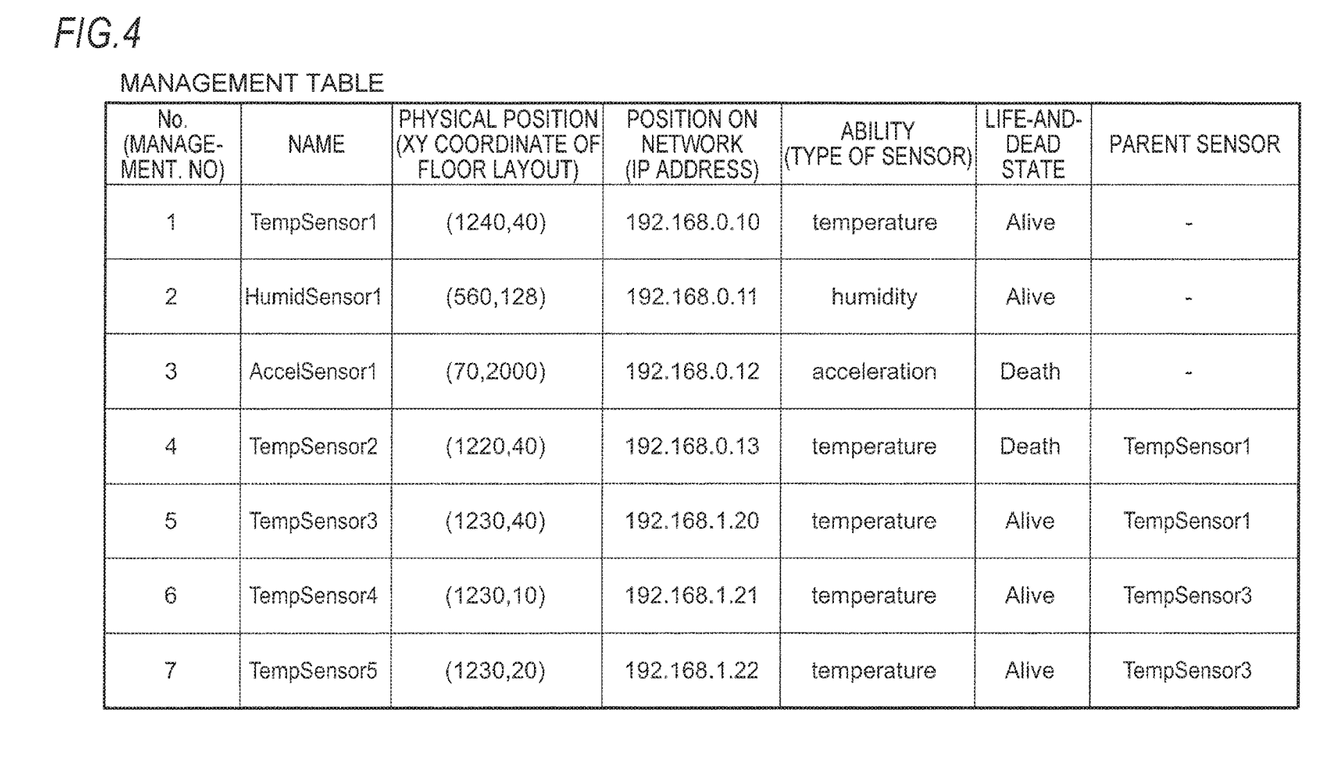
FIG. 4 is a view illustrating one example of a management table stored in a memory of the image forming apparatus.

FIG. 4 is a view illustrating one example of the management table stored in the memory 105 of the image forming apparatus 100.

Information on each sensor S is registered in the management table according to the present exemplary embodiment. More specifically, information on a management number, name, physical position (position coordinate of each sensor S in the office room), position (IP address) on a network, ability (the type of the sensor S), the life-and-death state and a parent sensor S is registered in the management table in association.

In the present exemplary embodiment, when the user operates the operation unit 106 of the image forming apparatus 100, the management table is displayed on the display 107 to allow the user to check a list of the sensors S provided in the office room.

Furthermore, in the present exemplary embodiment, when any one of the sensors S is selected from this list by the user, as described above, the light source of the sensor S is lit up or down to allow the user to confirm the sensor S in the office room based on this lighting-up/down.

Further, in the present exemplary embodiment, as described above, the information on the management number, the name, the physical position, the position on a network, the ability, the life-and-death state and the parent sensor S may be associated with each other. As a result, when the user input some of the information on the sensor S such as the name of the sensor S to the operation unit 106, the user may check other information on the sensor S such as the physical position and the position on the network of the sensor S.

Figure 5:
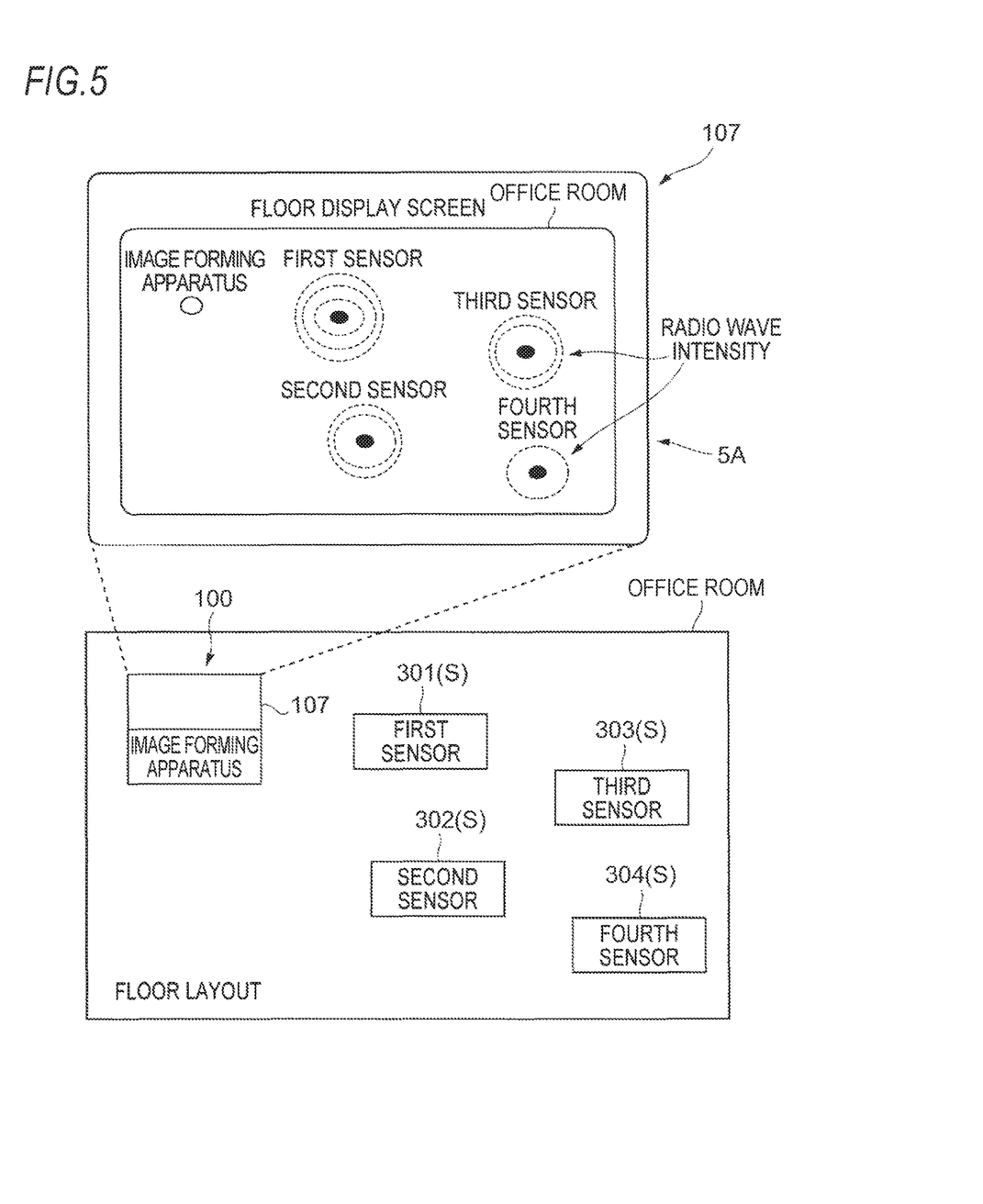
FIG. 5 is a view illustrating another display example on a display of the image forming apparatus.

FIG. 5 is a view illustrating another display example on the display 107 of the image forming apparatus 100.

In the present exemplary embodiment, as described above, a physical position is acquired for each sensor S and information on this physical position is registered in the management table.

In the present exemplary embodiment, when the user requests the operation unit 106 to display the position of the sensor S, information on the physical position of each sensor S is read from the management table and the position of each sensor S is displayed on the display 107 of the image forming apparatus 100, as indicated by reference numeral 5A of FIG. 5.

In this display, the position of the image forming apparatus 100 is also displayed. In addition, in this display, the office room is also displayed. By referring to this display on the display 107, the user may grasp where each of the sensors S is present in the office room.

Although FIG. 5 is a top view (a view when viewing the office room from above), a side view (a view when viewing the office room from the side) may be displayed. In this case, it is possible to grasp the position of each sensor S in the vertical direction.

In addition, although the case where the physical position of each sensor S is displayed on the display 107 has been described here, an image indicating the physical position of each sensor S may be formed on a sheet and the sheet with the image indicating the physical position of each sensor S may be output.

In the display shown in FIG. 5, not only the position information of each sensor S but also information on the office room (such as information on the size and shape of the office room) is also required.

The information on the office room may be acquired, for example, by scanning a floor map, on which the office room is located, with the image forming apparatus 100 to take the floor map into the image forming apparatus 100 and by analyzing the floor map (a scanned image of the floor map) with the image forming apparatus 100.

Further, for example, electronic data obtained by computerizing the floor map of the office room may be transmitted from a personal computer (PC) or the like to the image forming apparatus 100 so that the information on the office room may be taken into the image forming apparatus 100.

Further, for example, the information on the office room may be acquired by running a self-propelled robot equipped with a camera in the office room.

In the present exemplary embodiment, in performing the display illustrated in FIG. 5, the image forming apparatus 100 generates a screen in which a sensor S is superimposed on the floor map, and displays the generated image on the display 107.

In the present exemplary embodiment, information on the plural sensors S provided in the office room is stored in the image forming apparatus 100 and is consolidated in one place.

Therefore, by operating the image forming apparatus 100, the user may check the information on all the sensors S provided in the office room.

Here, the management of the sensors S may be performed by individual providers who have provided the sensors S. However, in this case, the information may be diffused so that the sensors S may not be fully managed.

Furthermore, in the present exemplary embodiment, the information on the sensors S is stored in the image forming apparatus 100 rather than a PC or the like possessed by the user.

Once the image forming apparatus 100 is provided in the office room, it is not frequently moved. Therefore, when the information on the sensors S is stored in the image forming apparatus 100, the information on the sensors S will hardly be moved (diffused).

Furthermore, since the number of provided image forming apparatuses 100 is smaller than the PCs or the like, when the information of the sensors S is stored in the image forming apparatus 100, the information of the sensors S is hardly distributed and stored in plural apparatuses.

Figure 6:
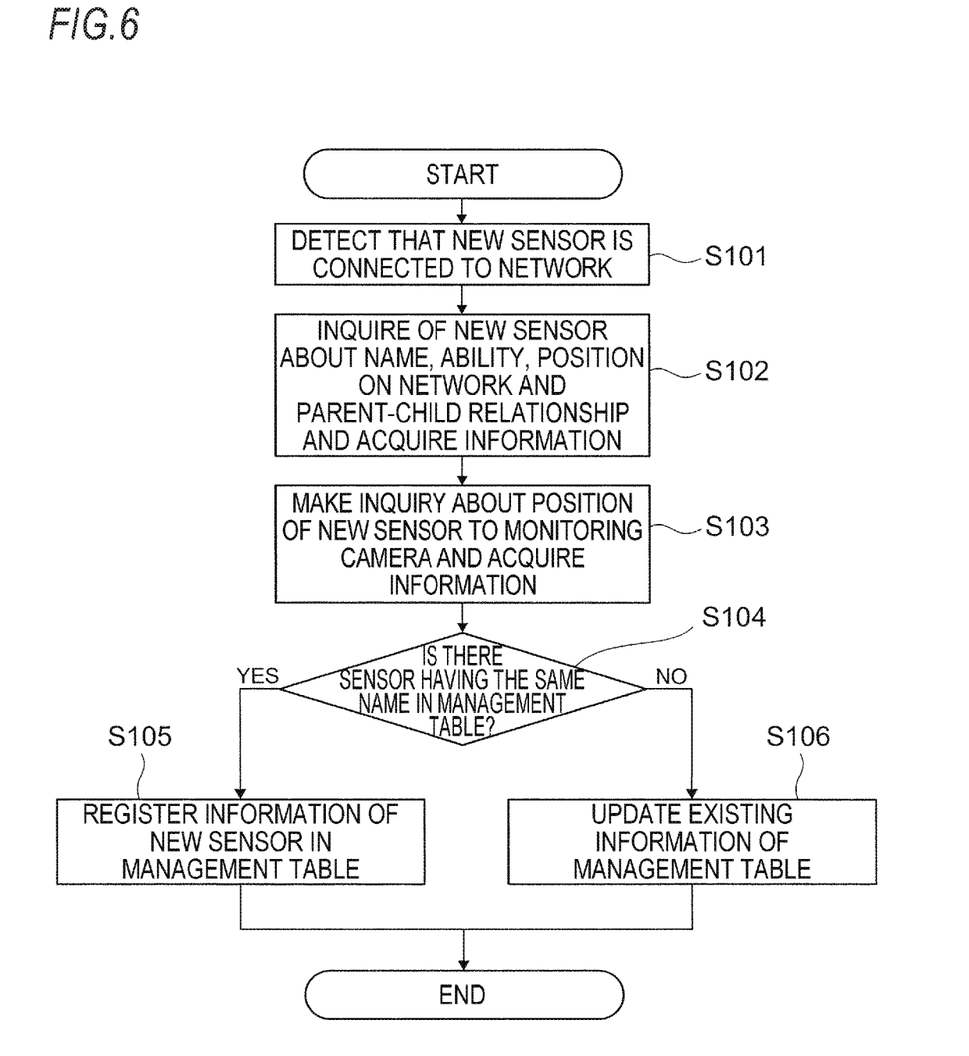
FIG. 6 is a flowchart illustrating a flow of a process when information on a newly provided sensor is registered in the management table of the image forming apparatus.

FIG. 6 is a flowchart illustrating a flow of a process when information on a newly provided sensor S is registered in the management table of the image forming apparatus 100.

In the present exemplary embodiment, first, the communication unit 110 of the image forming apparatus 100 detects that a newly provided sensor S (hereinafter referred to as a "new sensor S") is connected to the network (step 101).

Next, the communication unit 110 of the image forming apparatus 100 inquires of the new sensor S about its name, ability, position on a network, parent-child relationship and the like and acquires these pieces of information (step 102).

Incidentally, in this process example, various information such as a name has been already stored in the new sensor S, and the new sensor S is provided with an information transmitting/receiving unit.

In the processing of the step 102, an inquiry is made to the new sensor S from the communication unit 110 of the image forming apparatus 100 and, in response to this inquiry, the various information of the new sensor S is transmitted from the new sensor S to the image forming apparatus 100.

Further, in this process example, it is assumed that the new sensor S is provided within the monitoring range of the first monitoring camera 201 or the second monitoring camera 202 which has been already provided.

In this case, the sensor information acquiring unit 61 (see FIG. 3) of the image forming apparatus 100 makes an inquiry about the position of the new sensor S to the first monitoring camera 201 or the second monitoring camera 202, and acquires information (information indicating the relative position of the new sensor S to the first monitoring camera 201 or the second monitoring camera 202) returned from the first monitoring camera 201 or the second monitoring camera 202 (step 103).

Then, the sensor information acquisition unit 61 grasps the physical position of the new sensor S based on the information indicating the physical position of the first monitoring camera 201 or the second monitoring camera 202 (already stored in the management table) and the information indicating the relative position.

Next, the sensor information acquiring unit 61 of the image forming apparatus 100 checks whether or not there is a sensor S having the same name as the new sensor S in the management table (step 104). When the sensor S having the same name is not found in the management table, the storage controller 62 registers information on the new sensor S in the management table (step 105).

Meanwhile, when it is determined in step 104 that the sensor S having the same name as that of the new sensor S is found in the management table, the existing information on the management table is updated to new information as necessary (step 106).

Figure 7:
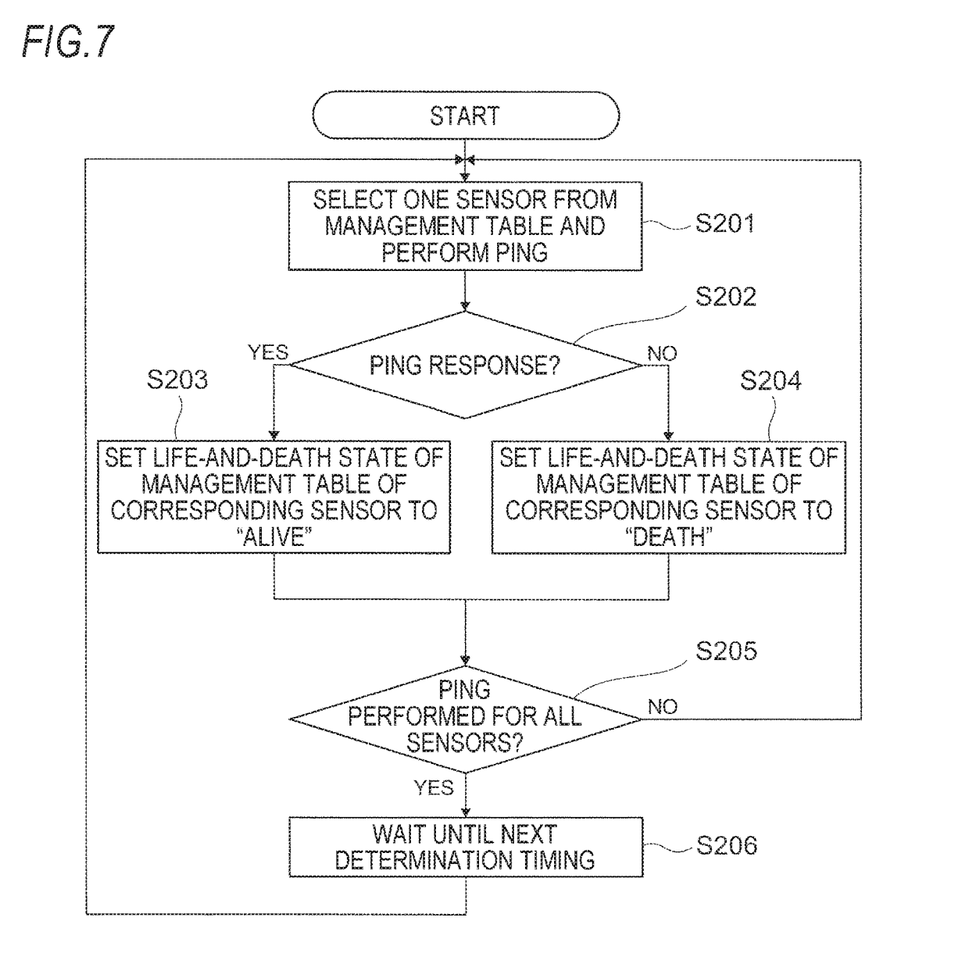
FIG. 7 is a flowchart illustrating a flow of a process executed when a state grasping unit of the image forming apparatus checks the life-and-death state of each sensor.

FIG. 7 is a flowchart illustrating a flow of a process executed when the state grasping unit 63 of the image forming apparatus 100 checks the life-and-death state of each sensor S.

In checking the life-and-death state of each sensor S, first, the state grasping unit 63 (see FIG. 3) of the image forming apparatus 100 selects one sensor S from the management table and performs ping of the selected sensor S (step 201). Then, the state grasping unit 63 determines whether or not there is a ping response (step 202).

When it is determined that there is a ping response, the state grasping unit 63 determines that the sensor S is working and sets the life-and-death state of the sensor S to "alive" (step 203).

More specifically, in the present exemplary embodiment, as illustrated in FIG. 4, a field for registering the life-and-death state of each sensor S is provided in the management table, and the state grasping unit 63 registers information of "alive" indicating that the sensor S is working in the field indicating the life-and-death state for the working sensor S.

Meanwhile, if it is determined in step 202 that there is no ping response, the state grasping unit 63 determines that the sensor S is not working, and sets the life-and-dead state to "death" (step 204).

More specifically, the state grasping unit 63 registers the information of "death" in the field indicating the life-and-death state in the management table for the sensor S not working, as illustrated in FIG. 4.

Thereafter, the state grasping unit 63 determines whether or not ping has been performed for all the sensors S (step 205). When it is determined that ping has been performed for all the sensors S, the state grasping unit 63 waits until the next determination timing comes (step 206).

Meanwhile, if it is determined in step 205 that ping has not been performed for all the sensors S, the state grasping unit 63 performs the process again after the step 201.

Next, another configuration example will be described.

In the above description, the case where the image forming apparatus 100 is fixedly arranged has been described. However, the image forming apparatus 100 may be configured to automatically move. In other words, the image forming apparatus 100 may be configured to move autonomously. Further, the image forming apparatus 100 itself may grasp the name, the physical position and the like of each sensor S.

A mechanism for moving the image forming apparatus 100 includes, for example, a wheel provided at the bottom of the image forming apparatus 100 and a motor for rotating the wheel.

In the case of moving the image forming apparatus 100 itself, for example, the image forming apparatus 100 receives a radio wave from a sensor S provided in the office room, measures the intensity of the radio wave, and further grasps the physical position of the sensor S based on the direction of the radio wave and the intensity of the radio wave.

After specifying the physical position of the sensor S, the image forming apparatus 100 approaches the sensor S based on the position information of the sensor S. Then, the image forming apparatus 100 captures the sensor S using the camera 112 (see FIG. 2) to obtain a captured image of the sensor S.

Further, the image forming apparatus 100 analyzes the captured image to acquire the name and type of the sensor S. Specifically, the image forming apparatus 100 analyzes a two-dimensional barcode (a two-dimensional barcode attached to the sensor S) and the like included in the captured image to acquire the name and type of the sensor S.

Thereafter, the image forming apparatus 100 registers the acquired position and name of the sensor S in the management table. Although the case of acquiring the name and type of the sensor S from the two-dimensional barcode has been described here, the shape of the sensor S may be analyzed to acquire the name and type of the sensor S.

In the meantime, the sensor S is not limited to the fixed arrangement but may include a so-called wearable sensor S (portable sensor S) which is moved within the office room.

In this case, the physical position of the sensor S may be grasped based on signals (indicating positions) transmitted from plural transmitters provided in the office room.

Specifically, in this case, the sensor S grasps its own position (physical position) based on a radio wave transmitted from a transmitter, and outputs this position to the image forming apparatus 100.

Accordingly, the image forming apparatus 100 grasps the position of the sensor S. Then, as described above, the image forming apparatus 100 registers the physical position of the sensor S in the management table.

In addition, in order to register the position of the sensor S in the management table, a provider who provides the sensor S may input the position information of the sensor S through the operation unit 106 (see FIG. 2) of the image forming apparatus 100.

Further, the physical position of the sensor S may be grasped by using a terminal (such as a tablet terminal or a smartphone) owned by the provider who provides the sensor S.

More specifically, in this case, a number of transmitters (transmitting signals indicating provision positions) are provided in the office room in advance. The provider provides the terminal at a provision scheduled position of the sensor S, receives a radio wave transmitted from a transmitter at this terminal, and obtains the position information of the provision scheduled position of the sensor S.

Thereafter, the provider operates the operation unit 106 or the like of the image forming apparatus 100 to register the position information in the management table of the image forming apparatus 100.

Figure 8:
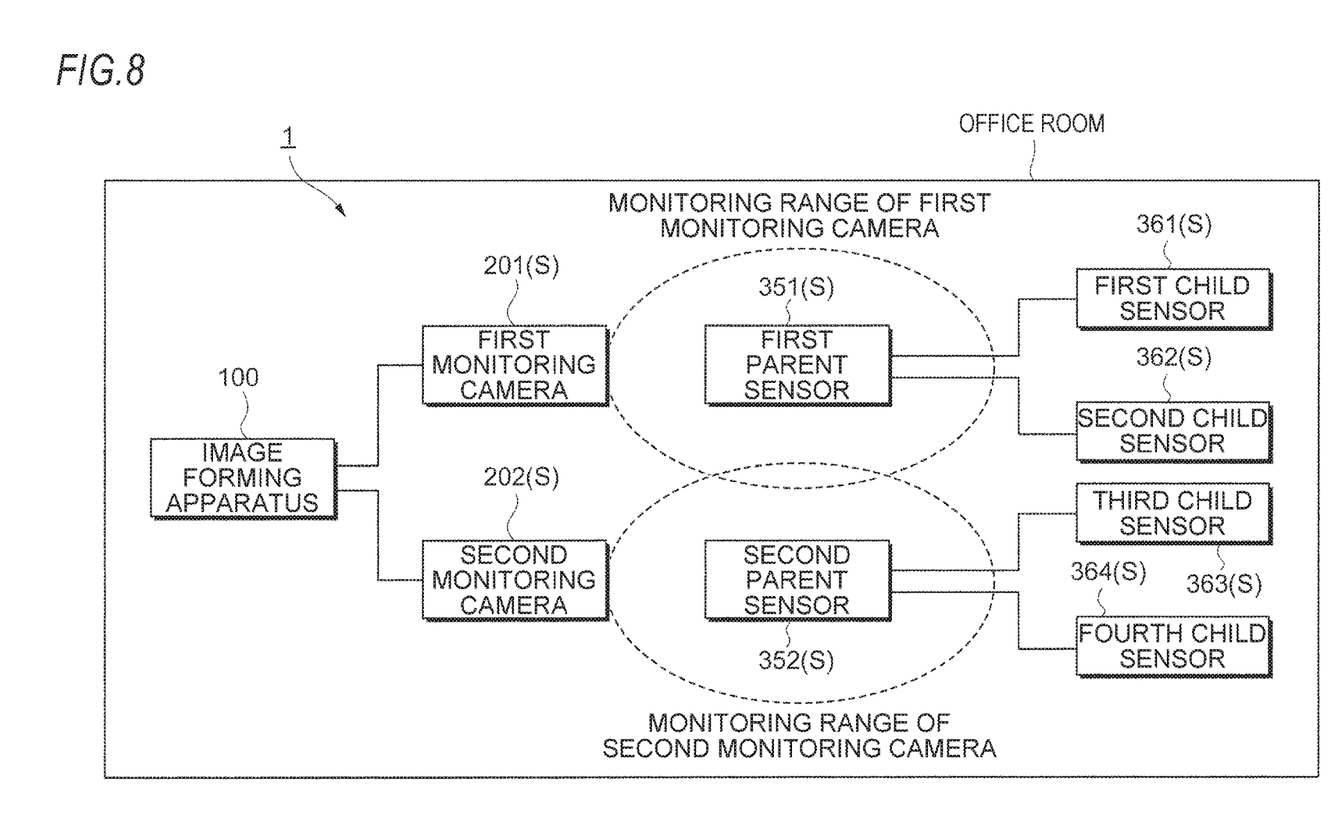
FIG. 8 is a view illustrating another configuration example of the device management system.

FIG. 8 is a view illustrating another configuration example of the device management system 1.

In the device management system 1, sensors S are arranged in a tree structure and the upper sensor S specifies the physical position of the lower sensor S.

More specifically, in the device management system 1, it is assumed that the first monitoring camera 201 and the second monitoring camera 202 have been already provided and, thereafter, parent sensors S (a first parent sensor 351 and a second parent sensor 352) and child sensors S (first to fourth child sensors 361 to 364) are provided.

In this configuration example, first, the first parent sensor 351 and the second parent sensor 352 are provided within the monitoring ranges of the first monitoring camera 201 and the second monitoring camera 202.

In the same manner as described above, the name and physical position of the first parent sensor 351 and the second parent sensor 352 are specified by the first monitoring camera 201 and the second monitoring camera 202, and information such as the name and physical position for the first parent sensor 351 and the second parent sensor 352 is registered in the management table.

Next, in this example, the child sensors S are placed below the parent sensors S. Specifically, the first child sensor 361 and the second child sensor 362 are placed below the first parent sensor 351, and the third child sensor 363 and the fourth child sensor 364 are placed below the second parent sensor 352. In other words, the plural child sensors S are placed within a range where the plural child sensors S may communicate with the parent sensors S.

Then, the parent sensors S specify the intensities and directions of radio waves transmitted from the child sensors S to specify the physical positions of the child sensors S. Further, in this configuration example, information on the child sensors S (such as the names and types of the child sensors S) is transmitted from the child sensors S to the parent sensors S.

Then, the parent sensors S transmit the position information (physical position information) of the child sensors S and the information (information such as the names and types of the child sensors S) obtained by the child sensors S to the image forming apparatus 100. Further, the parent sensors S transmit their own information (information such as the names and types of the parent sensors S) to the image forming apparatus 100.

Then, in the image forming apparatus 100, the information (the information of the parent sensors S and the child sensors S) transmitted from the parent sensors S is registered in the management table.

In this configuration example, the image forming apparatus 100 does not directly grasp the information on the child sensors S.

The positions of the child sensors S are grasped by the parent sensors S and the image forming apparatus 100 grasps the positions of the child sensors S based on the information from the parent sensors S.

The information such as the name of the child sensors S is also transmitted to the image forming apparatus 100 via the parent sensors S. The image forming apparatus 100 obtains the information on the child sensors S from the information transmitted from the parent sensors S.

In other words, in this configuration example, the information on some of the plural provided sensors S is acquired by other sensors S. Then, the image forming apparatus 100 acquires information from the other sensors S to acquire the information on the some sensors S.

Figure 9:
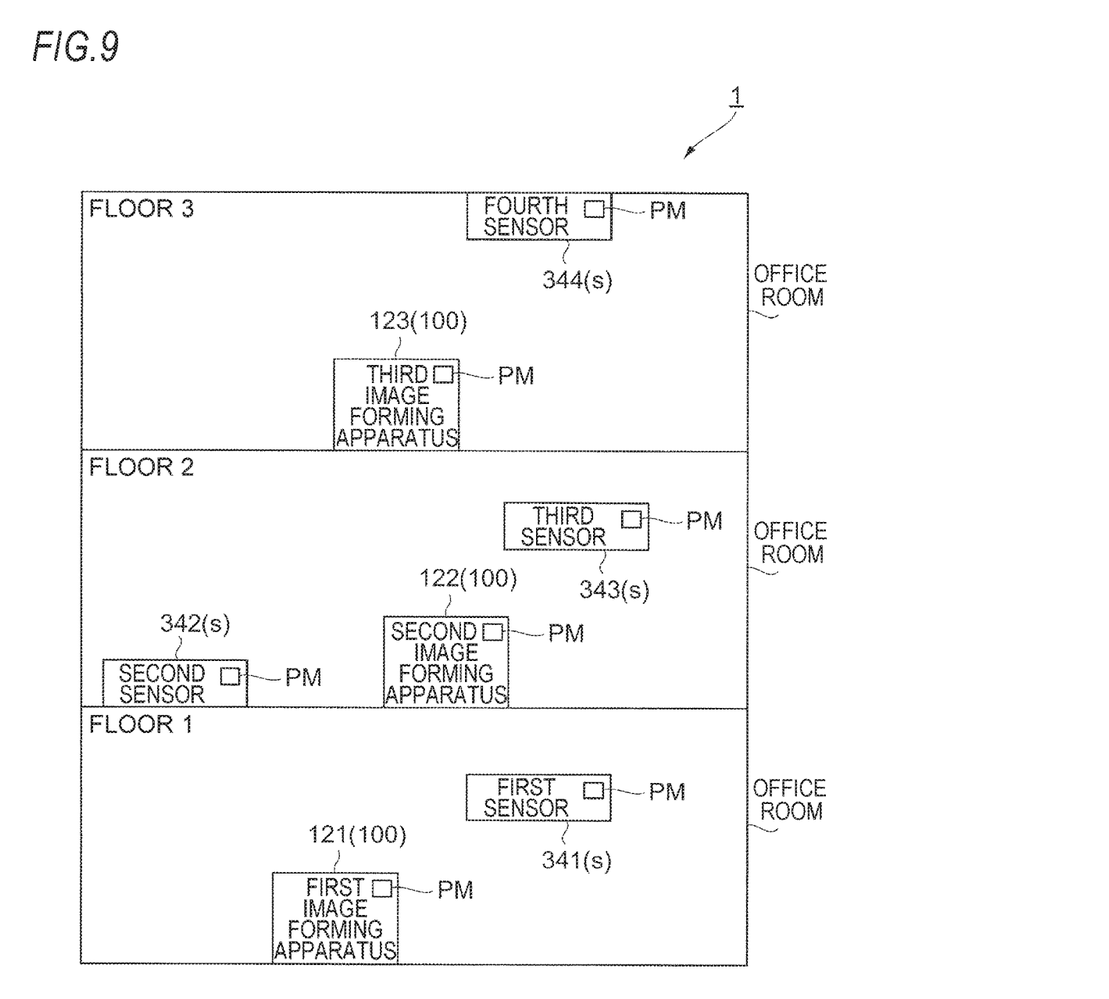
FIG. 9 is a view illustrating a further configuration example of the device management system.

FIG. 9 is a view illustrating a further configuration example of the device management system 1.

In this configuration example, four sensors S, namely first to fourth sensors 341 to 344, are provided. Furthermore, each of the sensors S includes a barometer PM.

Also, in this configuration example, plural floors, first to third floors, each having an office room, are provided. Further, a sensor S is provided in each office room.

An image forming apparatus 100 is provided in each office room. Further, a barometer PM is also provided in each image forming apparatus 100.

In this configuration example, a radio wave transmitted from each of the first sensor 341, the second sensor 342 and the third sensor 343 is received by a first image forming apparatus 121 provided on the first floor, and the first image forming apparatus 121 acquires an atmospheric pressure value obtained by each of the first sensor 341, the second sensor 342 and the third sensor 343.

Further, the first image forming apparatus 121 compares the atmospheric pressure value obtained by the barometer PM of the first image forming apparatus 121 with the atmospheric pressure value obtained by each of the first sensor 341, the second sensor 342 and the third sensor 343 to grasp a sensor S provided on the same floor as its own provision floor.

In this example, the atmospheric pressure value obtained by the first image forming apparatus 121 and the atmospheric pressure value obtained by the first sensor 341 are close to each other, and the first image forming apparatus 121 determines that the sensor S provided on the same floor as its own provision floor is the first sensor 341.

Then, the first image forming apparatus 121 registers only information on the first sensor 341 provided on the same floor as its own provision floor in its own management table.

In other words, the first image forming apparatus 121 registers only the first sensor 341 provided between the bottom of the first floor and the ceiling thereof in the management table.

Furthermore, in this configuration example, the information indicating that the first image forming apparatus 121 is provided on the first floor (information on the provision floor of the first image forming apparatus 121) is stored in advance in the first image forming apparatus 121.

In this configuration example, each of a second image forming apparatus 122 and a third image forming apparatus 123 acquires the information indicating that the first image forming apparatus 121 is provided on the first floor and the atmospheric pressure value obtained by the first image forming apparatus 121 from the first image forming apparatus 121.

The second image forming apparatus 122 and the third image forming apparatus 123 grasp their own provision floors based on the atmospheric pressure values obtained by the barometers PM of their own and the atmospheric pressure value obtained by the first image forming apparatus 121.

In this example, the second image forming apparatus 122 grasps that its own provision floor is the second floor, and the third image forming apparatus 123 grasps that its own provision floor is the third floor.

Further, like the first image forming apparatus 121, the second image forming apparatus 122 registers the sensor S located on the same floor as the floor where the second image forming apparatus 122 is provided, in the management table.

Specifically, the second image forming apparatus 122 compares the atmospheric pressure value obtained by the barometer PM of its own with the atmospheric pressure value obtained by each sensor S to grasp the sensor S provided on the same floor as the provision floor of its own. Then, only information on this sensor S is registered in its own management table.

In this example, the second image forming apparatus 122 grasps that the second sensor 342 and the third sensor 343 are sensors S provided on the same floor as the provision floor of its own, and information on the second sensor 342 and the third sensor 343 is registered in the management table of the second image forming apparatus 122.

The same applies to the third image forming apparatus 123. The third image forming apparatus 123 registers the fourth sensor 344 located on the same floor as the floor where the third image forming apparatus 123 is provided, in its own management table.

Specifically, the third image forming apparatus 123 compares the atmospheric pressure value obtained by its own barometer PM with the atmospheric pressure value obtained by each sensor S to grasp the sensor S provided on the same floor as its own provision floor. Then, information on this sensor S is registered in its own management table.

Specifically, the third image forming apparatus 123 grasps that the fourth sensor 344 is the sensor S provided on the same floor as its own provision floor, and registers information on the fourth sensor 344 in its own management table of the third image forming apparatus 123.

In the configuration example illustrated in FIG. 9, a reference image forming apparatus 100 (in this example, the first image forming apparatus 121) is determined, and information on its own provision floor is registered in the reference image forming apparatus 100.

The other image forming apparatus 100 acquires the information and atmospheric pressure value on the provision floor of the reference image forming apparatus 100 from the reference image forming apparatus 100. Then, based on the atmospheric pressure value of the other image forming apparatus 100, the atmospheric pressure value acquired from the reference image forming apparatus 100 and the provision floor of the reference image forming apparatus 100, the other image forming apparatus 100 grasps which floor it is located on.

More specifically, in this configuration example, each of the image forming apparatuses 100 and the sensors S includes a barometer PM to acquire an atmospheric pressure value.

In this configuration example, when the atmospheric pressure value obtained by an image forming apparatus 100 is close to the atmospheric pressure value obtained by a sensor S, it is determined that the image forming apparatus 100 and the sensor S are provided on the same floor, and information on this sensor S is registered in a management table of the image forming apparatus 100.

Meanwhile, if a difference between the atmospheric pressure value obtained by the image forming apparatus 100 and the atmospheric pressure value obtained by the sensor S is large, it is determined that the image forming apparatus 100 and the sensor S are provided on different floors. In this case, the information on this sensor S is registered in a management table of an image forming apparatus 100 provided at a different floor.

Here, there are cases where plural image forming apparatuses 100 are provided. More specifically, as illustrated in FIG. 9, the image forming apparatuses 100 are provided in different office rooms in different provision floors or plural image forming apparatuses 100 are provided in one office room.

In the case where the plural forming apparatuses 100 are provided in this way, the image forming apparatuses 100 may communicate with each other so that sensors S managed by the respective image forming apparatuses 100 do not overlap each other.

In other words, one sensor S may not be registered in the plural image forming apparatuses 100.

Here, in the case where the plural image forming apparatuses 100 are provided, in a case where a radio wave (signal) from one sensor S is received by the plural image forming apparatuses 100 (a case where there is a possibility that one sensor S is managed by the plural image forming apparatuses 100), for example, one image forming apparatus 100 receiving a stronger radio wave manages this sensor S in preference. The reason is that the stronger the radio wave, the lower the possibility that the communication will be disconnected.

Here, the determination of the one image forming apparatus 100 that manages the sensor S is performed, for example, by transmitting the intensity of the radio wave received by each of the image forming apparatuses 100 to the other image forming apparatus 100 and comparing the intensities of radio waves in each of the image forming apparatuses 100.

More specifically, each of the image forming apparatuses 100 compares the intensity of its own received radio wave with the intensity of the radio wave transmitted from the other image forming apparatus 100, and when the intensity of its own received radio wave is the largest, manages the sensor S by itself.

Meanwhile, when the intensity of its own received radio wave is not the largest, it means that the intensity of the radio wave received by the other image forming apparatus 100 is larger. In this case, the other image forming apparatus 100 manages the sensor S.

More specifically, each of the image forming apparatuses 100 includes a communication unit 110 (see FIG. 2) functioning as a transmitting/receiving unit, and transmits the intensity of its own received radio wave (information on the sensor S acquired by itself) to the other image forming apparatus 100.

Further, each of the image forming apparatuses 100 receives the intensity of the radio wave received by the other image forming apparatus 100 (information on the sensor S acquired by the other image forming apparatus 100) from the other image forming apparatuses 100.

Then, each of the image forming apparatuses 100 determines whether or not the intensity of its own received radio wave is the largest, and manages the sensor S which has transmitted the radio wave when the intensity is the largest.

(Others)

Each of the image forming apparatuses 100 and the sensors S may have plural interfaces, in which a case, the interfaces to be used may be switched. The switching of the interfaces is performed, for example by sending a signal, which indicates the switching of the interfaces to be used, from the corresponding image forming apparatus 100 to the corresponding sensor S.

Further, the image forming apparatus 100 may be connected to a cloud or an external server, and information from the sensor S may be output to the cloud or the external server via the image forming apparatus 100. Furthermore, the output of each sensor S may be monitored by the cloud or the external server, and the cloud or the external server may manage an office room based on the output of each sensor S.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A device management system comprising:
 a plurality of sensors that are provided in an office room, each of which grasps surrounding situations; and
 an image forming apparatus that is provided in the office room, includes a storage unit configured to store information about the plurality of sensors, and is configured to form an image on a recording material,
 wherein the image forming apparatus is further configured to control a display to display a map of the office room, the map including a location of at least one of the plurality of sensors by using the information about the plurality of sensors.

2. The device management system according to claim 1, wherein
 the image forming apparatus is further configured to receive information on situations grasped by each of the plurality of sensors.

3. The device management system according to claim 2, further comprising:
 a plurality of the image forming apparatus, including the image forming apparatus and each configured to transmit and receive the information about the sensors to and from each other.

4. The device management system according to claim 2, wherein
 the image forming apparatus is further configured to grasp a state of each of the sensors.

5. The device management system according to claim 4, wherein
 at least some of the plurality of sensors include a light source, and
 the image forming apparatus is further configured to grasp the state of each of the sensors by using a light emission state of the light source.

6. The device management system according to claim 1, further comprising:
 a plurality of the image forming apparatus, including the image forming apparatus and each of configured to transmit and receive the information about the sensors to and from each other.

7. The device management system according to claim 6, wherein
 the image forming apparatus is further configured to grasp a state of each of the sensors.

8. The device management system according to claim 7, wherein
 at least some of the plurality of sensors include a light source, and
 the image forming apparatus is further configured to grasp the state of each of the sensors by using a light emission state of the light source.

9. The device management system according to claim 1, wherein
 the image forming apparatus is further configured to grasp a state of each of the sensors.

10. The device management system according to claim 9, wherein
 at least some of the plurality of sensors include a light source, and
 the image forming apparatus is further configured to grasp the state of each of the sensors by using a light emission state of the light source, and
 the image forming apparatus is further configured to grasp a state of a first sensor, of the plurality of sensors, by controlling the first sensor to adjust its light emission state of its light source and by controlling a second sensor of the plurality of sensors to detect whether the light emission state of the first sensor is adjusted.

11. The device management system according to claim 1, wherein
 the image forming apparatus includes a display and is further configured to control the display to display the information about the sensors.

12. The device management system according to claim 1, wherein
 at least some of the plurality of sensors are configured to acquire information about other ones of the sensors, and to acquire the information about the other sensors stored in the storage unit of the image forming apparatus.

13. The device management system according to claim 1, wherein the plurality of sensors and the image forming apparatus are connected to each other through a network,
wherein the image forming apparatus is further configured to detect a connection of a new sensor to the network, and in response to the detection:
transmit to the new sensor, through the network, an inquiry requesting the new sensor to provide information about at least one of an ability and a network position on the network of the new sensor,
determine a physical location of the new sensor in the office room, and
to update the map of the office room to include the physical location of the new sensor,
wherein the image forming apparatus is configured to determine the physical location of the new sensor by controlling at least one of the plurality of sensors to activate a camera of the one of the plurality of sensors and capture an image of the new sensor,
wherein the image forming apparatus is further configured to determine the physical location of the new sensor by receiving and determining both a direction and an intensity of a radio wave transmitted from the new sensor to at least one of the image forming apparatus and the plurality of sensors.

14. An image forming apparatus comprising:
at least one hardware processor configured to implement:
an image forming unit that forms an image on a recording material;
an acquiring unit that acquires information about a plurality of sensors, each of which grasps surrounding situations; and
a storage unit that stores the information about the plurality of sensors, the information being acquired by the acquiring unit
wherein the at least one hardware processor is further configured to implement controlling control a display to display a map of the office room, the map including a location of at least one of the plurality of sensors by using the information about the plurality of sensors.

15. The image forming apparatus according to claim 14, wherein the at least one hardware processor is further configured to implement:
a capturing unit that captures a status of the sensors.

16. The image forming apparatus according to claim 15, wherein
the image forming apparatus is configured to automatically move.

17. The image forming apparatus according to claim 14, wherein
the image forming apparatus is configured to automatically move.

18. The image forming apparatus according to claim 14, wherein the at least one hardware processor is further configured to implement:
a receiving unit that receives information acquired by other image forming apparatuses as the information about the sensors.

19. The image forming apparatus according to claim 14, wherein the at least one hardware processor is further configured to implement:
a transmitting unit that transmits at least some of the information about the plurality of sensors, the information being acquired by the acquiring unit, to other image forming apparatuses.

20. A non-transitory computer readable medium storing a program configured to cause a computer provided in an image forming apparatus, configured to form an image on a recording material, to execute a process, the process comprising:
acquiring information about a plurality of sensors, each of which grasps surrounding situations, provided in an office room; and
storing the acquired information about the plurality of sensors in a storage unit; and
controlling a display to display a map of the office room, the map including a location of at least one of the plurality of sensors by using the information about the plurality of sensors.

* * * * *